(12) United States Patent
Koide

(10) Patent No.: US 6,533,572 B1
(45) Date of Patent: Mar. 18, 2003

(54) INJECTION MOLDING MACHINE

(75) Inventor: Atsushi Koide, Nagano (JP)

(73) Assignee: Nissei Plastic Industial Co., Ltd., Nagano-Ken (JP)

( * ) Notice: Subject to any disclaimer, the term of this patent is extended or adjusted under 35 U.S.C. 154(b) by 124 days.

(21) Appl. No.: 09/667,588

(22) Filed: Sep. 22, 2000

(30) Foreign Application Priority Data

Sep. 22, 1999 (JP) .......................................... 11-269326

(51) Int. Cl.⁷ .......................... B29C 45/18; B29C 45/66
(52) U.S. Cl. ................... 425/587; 425/589; 425/451.7
(58) Field of Search .............................. 425/582, 583, 425/587, 589, 451.7

(56) References Cited

U.S. PATENT DOCUMENTS

| | | | | |
|---|---|---|---|---|
| 4,741,685 A | * | 5/1988 | Inaba et al. ................ 264/40.5 |
| 5,320,517 A | * | 6/1994 | Hirata et al. ............. 425/450.1 |
| 5,759,128 A | * | 6/1998 | Mizutani et al. ........... 475/149 |
| 5,795,509 A | * | 8/1998 | Fujikawa et al. ......... 264/328.1 |
| 6,059,556 A | * | 5/2000 | Koike et al. ................ 425/145 |
| 6,175,181 B1 | * | 1/2001 | Shirasaki ............... 310/323.04 |
| 6,227,839 B1 | * | 5/2001 | Yoshida et al. ............. 425/145 |

FOREIGN PATENT DOCUMENTS

| JP | A082567 | 1/1996 |
|---|---|---|
| JP | A10151653 | 6/1998 |

* cited by examiner

Primary Examiner—Jan H. Silbaugh
Assistant Examiner—Donald Heckenberg
(74) Attorney, Agent, or Firm—Birch, Stewart, Kolasch & Birch, LLP

(57) ABSTRACT

An injection molding machine is equipped with a drive mechanism which reciprocates a movable member, such as a screw or a mold clamping mechanism, by use of a servomotor and a ball screw mechanism. In the injection molding machine, an end portion of a rotor shaft of the servomotor is connected directly to an end portion of a ball screw (or a nut) of the ball screw mechanism for reciprocating the movable member. This structure enables rotation of the servomotor to be transmitted directly to the ball screw (or the nut) of the ball screw mechanism without intervention of a rotation transmission mechanism.

6 Claims, 5 Drawing Sheets

INJECTION MOLDING MACHINE

BACKGROUND OF THE INVENTION

1. Field of the Invention

The present invention relates to an injection molding machine equipped with a drive mechanism which reciprocates (i.e., advances and retreats) a movable member, such as a screw or an input member of a mold clamping mechanism, by use of a servomotor and a ball screw mechanism.

2. Description of the Relevant Art

Japanese Patent Publication (kokoku) No. 8(1996)-2567 and Japanese Patent Application Laid-Open (kokai) No. 10(1998)-151653 disclose a conventional injection molding machine in which a screw is reciprocated by means of a drive mechanism including a servomotor and a ball screw mechanism.

In general, an injection molding machine of such a type is designed such that the rear end of the screw is coupled to the nut of the ball screw mechanism; a servomotor is disposed on one side of the machine body; and rotation of the servomotor is transmitted to the ball screw of the ball screw mechanism via a rotation transmission mechanism. Thus, the rotational motion transmitted from the servomotor is converted to a linear motion by the ball screw mechanism; and the screw is advanced and retracted as a result of the linear motion of the nut. The rotation transmission mechanism consists of a toothed drive pulley attached to a rotor shaft of the servomotor, a toothed driven pulley attached to the ball screw of the ball screw mechanism, and a timing belt looped around and extending between the toothed drive pulley and the toothed driven pulley.

The above-described conventional injection molding machine has the following drawbacks.

First, the necessity of a space for disposing the rotation transmission mechanism results in an increased size of the machine body of the injection molding machine. In addition, the rotation transmission mechanism generates noise and decreases the rigidity. In particular, the decreased rigidity makes it difficult to increase the control gain (control constant), resulting in unstable control.

Second, since rotation is transmitted to the ball screw via the rotation transmission mechanism, responsiveness of control and accuracy of control decrease, and unbalanced load is imposed on the rotor shaft of the servomotor from the timing belt.

SUMMARY OF THE INVENTION

An object of the present invention is to provide an injection molding machine capable of reducing the size of the machine body and noise and increasing the gain (control constant) of a control system to thereby enhance the stability of the control system.

Another object of the present invention is to provide an injection molding machine capable of drastically enhancing responsiveness of control and accuracy of control and avoiding imposition of unbalanced load on the rotor shaft of a servomotor which would otherwise result from use of a timing belt.

To achieve the above objects, the present invention provides an injection molding machine equipped with a drive mechanism which reciprocates a movable member, such as a screw or an input member of a mold clamping mechanism, by use of a servomotor and a ball screw mechanism. In the injection molding machine, an end portion of a rotor shaft of the servomotor is connected directly to an end portion of a ball screw (or a nut) of the ball screw mechanism for reciprocating the movable member. This structure enables rotation of the servomotor to be transmitted directly to the ball screw (or the nut) of the ball screw mechanism without intervention of a rotation transmission mechanism.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of an injection molding machine M according to the present embodiment will be described with reference to FIGS. 1 to 6.

Figure 1:
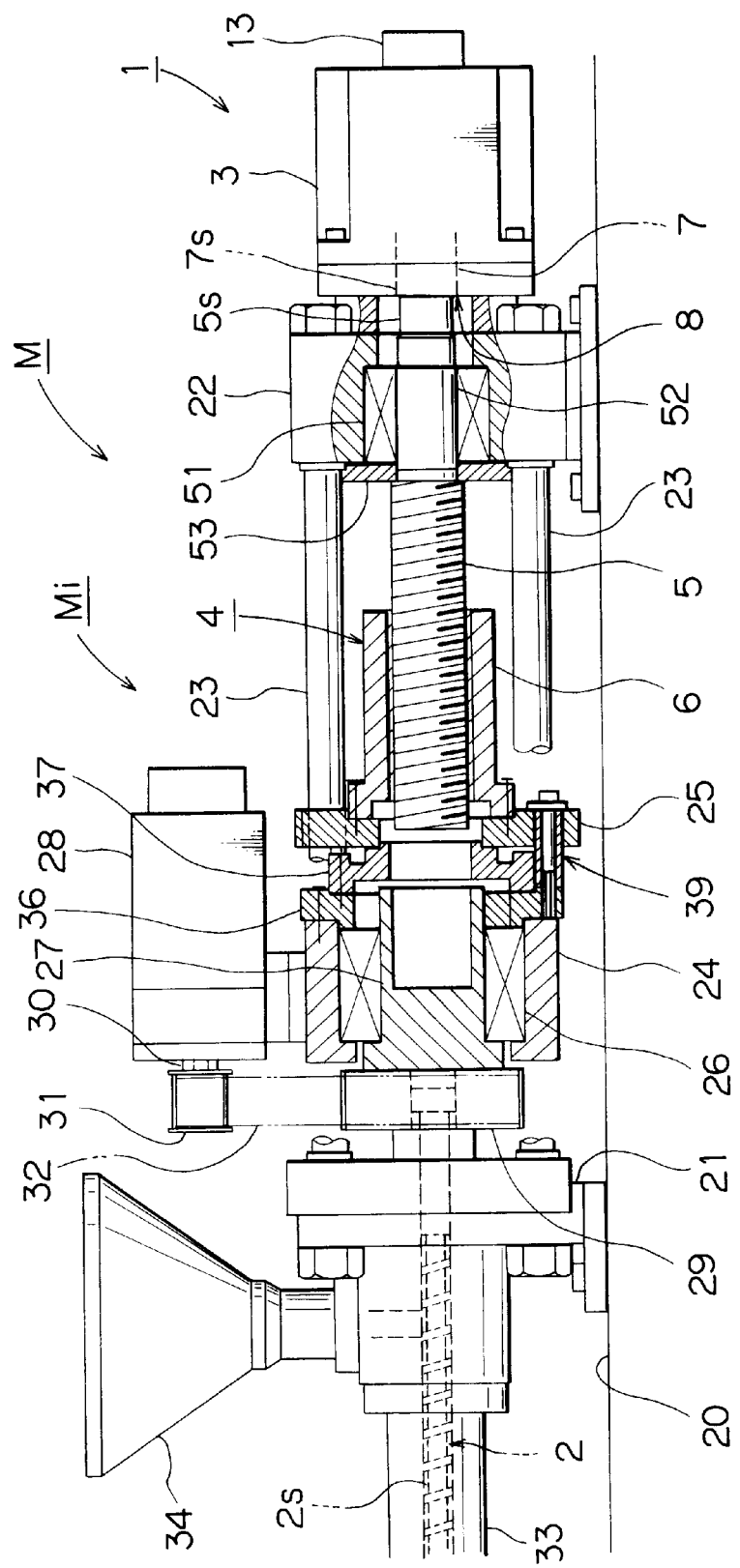
FIG. 1 is a partially sectional side view of an injection unit of an injection molding machine according to an embodiment of the present invention.
Figure 2:
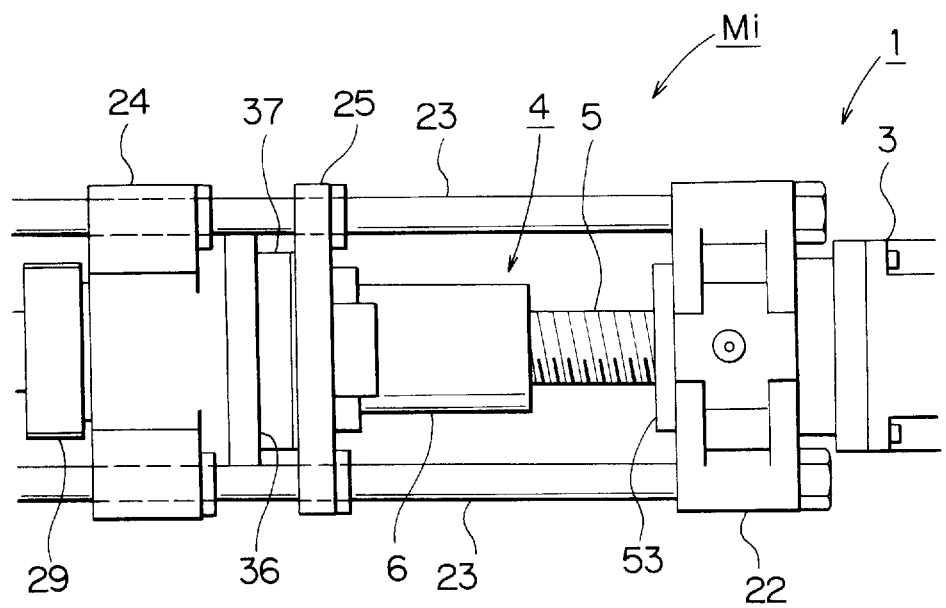
FIG. 2 is a plan view showing a portion of the injection unit.

FIG. 1 shows an injection unit Mi of the injection molding machine M. In FIG. 1, reference numeral 20 denotes a machine base. An injection base 21 and an injection drive base 22 are mounted apart from each other on the machine base 20. Four guide shafts 23 (see FIG. 5) extend between the injection base 21 and the injection drive base 22. A front slider 24 and a rear slider 25, which is separated from the front slider 24, are slidably mounted on the guide shafts 23 (see FIG. 2).

The front slider 24 has a hollow portion formed therein, thereby assuming the form of a cylinder. A bearing 26 is disposed within the hollow portion so as to rotatably support a screw coupling 27. A servomotor 28 for measuring use is disposed on the top surface of the front slider 24. A toothed driven pulley 29 is attached to the front end of the screw coupling 27. A toothed drive pulley 31 is attached to a rotor shaft 30 of the servomotor 28. A timing belt 32 is looped around and extends between the toothed driven pulley 29 and the toothed drive pulley 31, thereby forming a rotation transmission mechanism. The rear end of a heating cylinder 33 is attached to the front end face of the injection base 21. The heating cylinder 33 is equipped with a hopper 34 disposed at the rear portion of the heating cylinder 33. A screw 2s (movable member 2) extends through the heating cylinder 33. The rear end of the screw 2s is connected to the center of the screw coupling 27 (toothed driven pulley 29).

Figure 6:
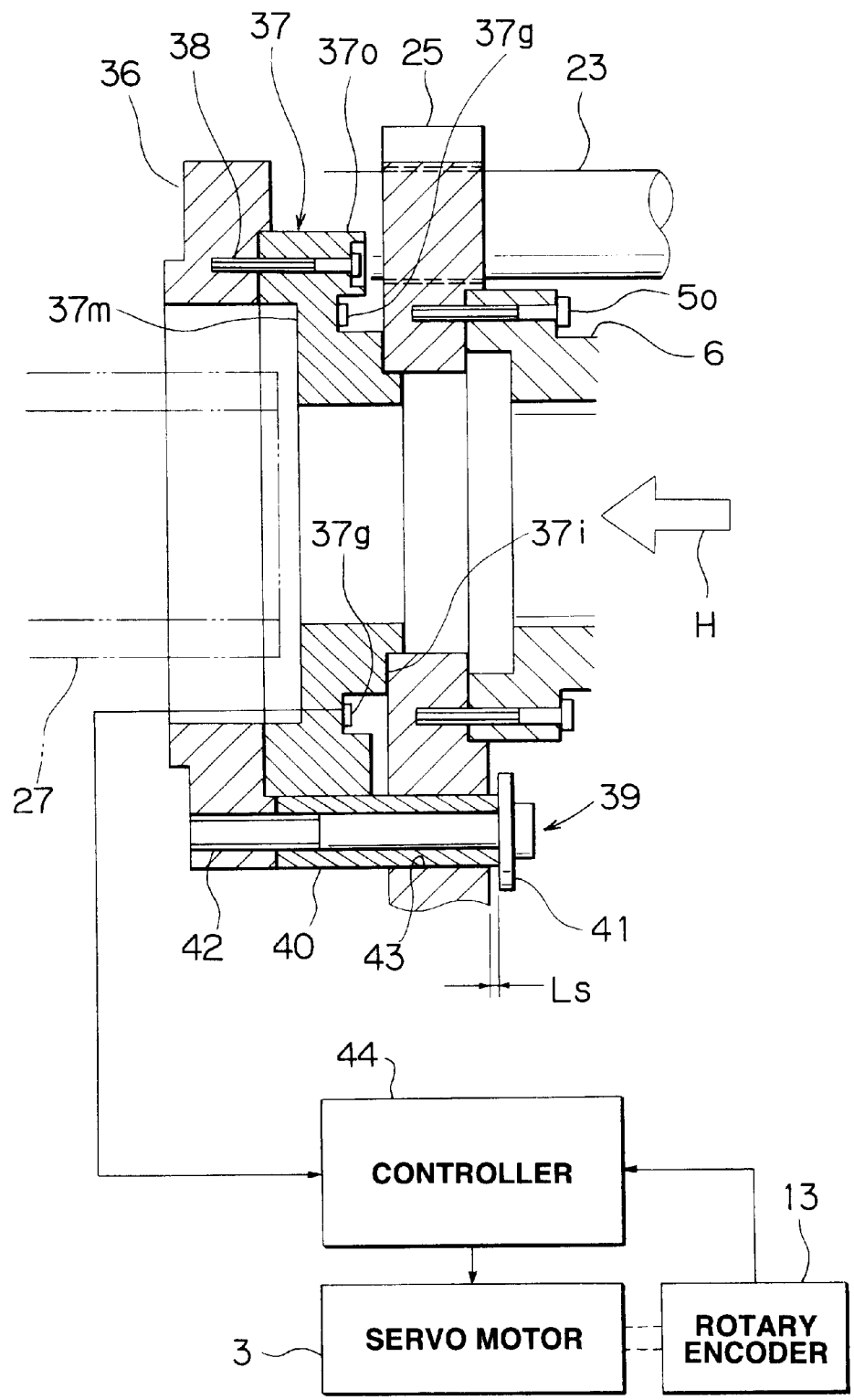
FIG. 6 is a sectional side view of a load cell disposed in the injection unit and its peripheral portions.

A bearing retainer ring 36 is attached to the rear end of the front slider 24. As shown in FIG. 6, an outer ring portion 37o of the load cell 37 is fixedly attached to the rear end face of the bearing retainer ring 36 by means of a plurality of screws 38. Four stoppers 39 are attached to the bearing retainer ring 36 so as to restrain movement of the rear slider 25. The stoppers 39 do not contact the load cell 37. Each of the stoppers 39 includes a guide pipe 40 having a predetermined length; a stopper ring 41 located at an end of the guide pipe 40; and a screw 42 extending through the guide pipe 40 and the stopper ring 41 and screwed into the bearing retainer ring 36. The guide pipes 40 extend through the corresponding guide holes 43 formed in the rear slider 25, thereby guiding the rear slider 25 slidably (see FIG. 5). The length of the guide pipe 40 is selected such that the rear slider 25 can make a relative displacement by a predetermined stroke Ls in the reciprocating direction of the screw 2s. This stroke Ls may be as small as releasing the rear slider 25 from contact with the load cell 37 when the rear slider 25 is displaced rearward. Thus, when the rear slider 25 moves forward, the front end face thereof abuts an inner ring portion 37i of the load cell 37. When the rear slider 25 moves rearward, rearward displacement beyond the stroke Ls is restrained by the stopper rings 41. The load cell 37 includes a relatively thin-walled intermediate strain generation portion 37m formed integrally between the inner ring portion 37i and the outer ring portion 37o. A plurality of strain gauges 37g are disposed on the intermediate strain generation portion 37m and are connected to the input side of a controller 44. On the other hand, the rear slider 25 is connected to the drive mechanism 1 and is reciprocated by the drive mechanism 1.

Next, the structure of the drive mechanism 1, which is the main portion of the injection molding machine M of the present embodiment, will be described with reference to FIGS. 1 to 6.

The front end face of a nut 6 of the ball screw mechanism 4 is fixedly attached to the rear end face of the rear slider 25 by means of a plurality of screws 50. The injection drive base 22 has a hollow portion formed therein. A bearing 51 is disposed within the hollow portion so as to rotatably support a rear-end shaft portion 52 of the ball screw 5 of the ball screw mechanism 4. Reference numeral 53 denotes a bearing retainer ring fixedly attached to the front end face of the injection drive base 22.

Figure 3:
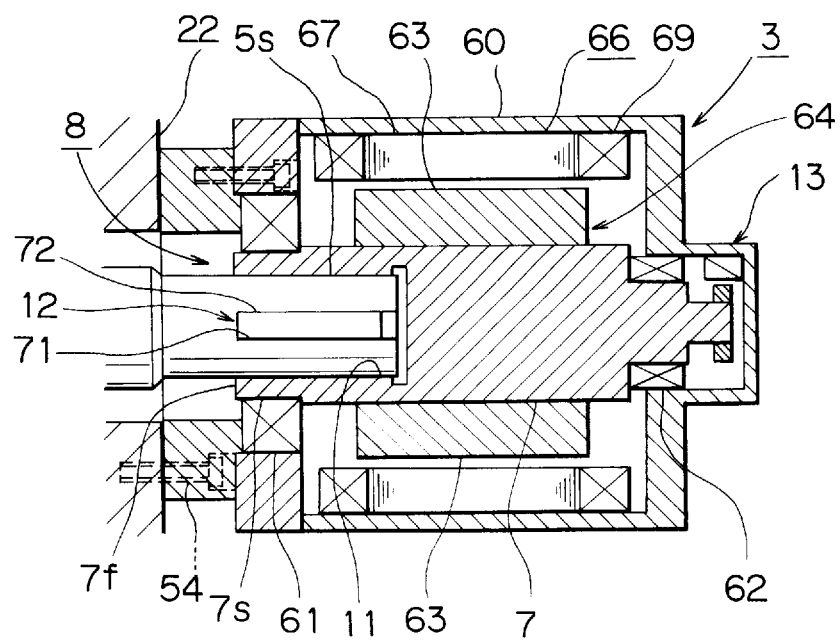
FIG. 3 is a schematically sectional side view of a servomotor used in the injection unit.

A servomotor 3 for injection use is fixedly attached to the rear end face of the injection drive base 22 by means of a plurality of screws 54. As shown in FIG. 3, the servomotor 3 includes a casing 60 of a non-magnetic material, forward and rearward bearings 61 and 62 disposed within the casing 60, and a rotor shaft 7 of a non-magnetic material supported rotatably by the bearings 61 and 62. Four magnets 63 are fixedly attached to the circumferential surface of the rotor shaft 7 located within the casing 60 such that the magnets 63 are spaced equally in the circumferential direction, thereby constituting a rotor (magnet rotor) 64 (see FIG. 4). The type and size of the magnet 63 are selected so as to obtain the highest magnetic flux density. Reference numeral 65 denotes a spacer disposed between the magnets 63.

A stator 66 is disposed on the inner circumferential surface of the casing 60 in such a manner as to face the rotor 64. The stator 66 includes a yoke member 67 formed through lamination of a number of annular silicon steel plates into the form of a cylinder. The yoke member 67 includes a number of core portions 68 formed on the inner side thereof. The core portions 68 are arranged at circumferentially constant pitches. A stator coil 69 is wound around (attached to) each of the core portions 68. The number of core portions 68 (the number of slots) is preferably not less than 36 so as to realize, in cooperation with high magnetic flux density effected by the magnets 63, a synchronous AC servomotor which outputs low-speed high-torque revolutions. As shown in FIG. 6, the servomotor 3 is connected to the output side of the controller 44.

Figure 4:
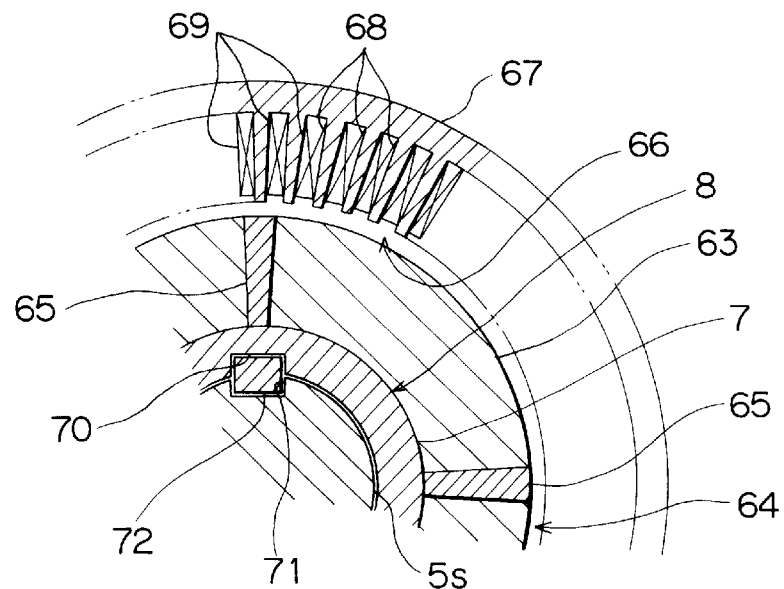
FIG. 4 is a schematically sectional front view showing a portion of the servomotor of FIG. 3.
Figure 5:
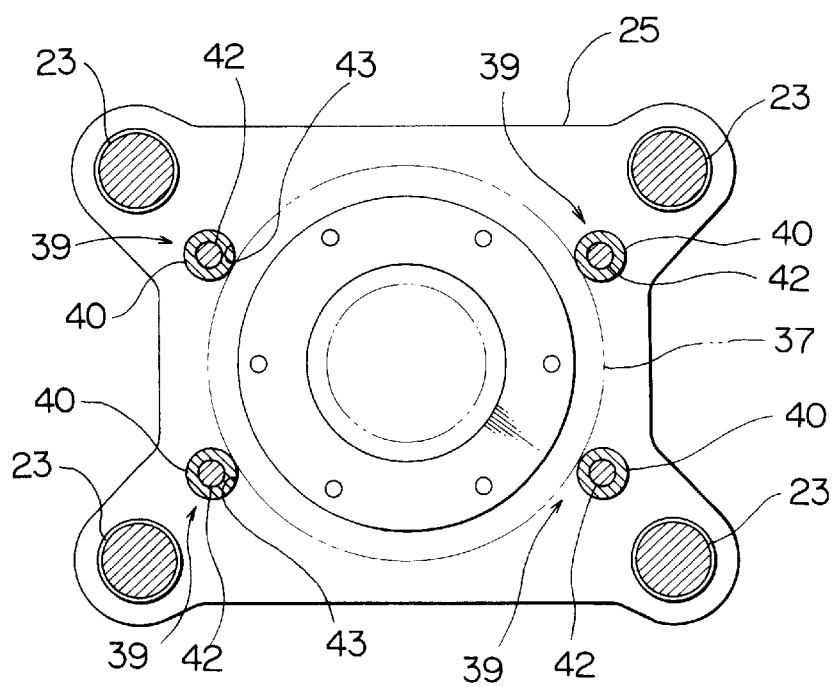
FIG. 5 is a rear view of a rear slider disposed in the injection unit.

As shown in FIG. 3, a front end portion 7s of the rotor shaft 7 and a rear end portion 5s of the ball screw 5 (rear-end shaft portion 52) of the ball screw mechanism 4 are directly coupled, thereby forming a direct coupling structure 8. More specifically, the rear end portion 5s of the ball screw 5 is inserted into a recess 11 formed in the rotor shaft 7 and extending axially from an end face 7f of the rotor shaft 7, while a shaft restraining mechanism 12 prevents rotation of the ball screw 5 with respect to the rotor shaft 7. As shown in FIG. 4, the shaft restraining mechanism 12 includes a groove 70 formed axially on the inner wall surface of the recess 11; a groove 71 formed axially on the circumferential surface of the rear end portion 5s; and a parallel pin 72 fitted into both the groove 70 and the groove 71. The thus-formed direct coupling structure 8 has an advantage in that the size thereof does not exceed the outer diameter of the rotor shaft 7.

Thus, rotation of the servomotor 3 is directly transmitted to the ball screw 5 of the ball screw mechanism 4. Since a rotation transmission mechanism having a timing belt is not involved, the machine body of the injection molding machine M can be made compact, and noise can be reduced. Also, since rigidity is enhanced, the control gain (control constant) can be increased, thereby enhancing stability of control.

A rotary encoder 13 is attached to the rear end face of the casing 60 in order to detect the number of revolutions (rotational speed) of the rotor 64. In order to accurately detect the rotational speed of the rotor 64 even when the rotor 64 is rotating at low speed, the rotary encoder 13 is configured so as to exhibit high resolution; i.e., to produce as many pulses as possible per revolution of the rotor 64. Specifically, the rotary encoder 13 desirably outputs 20,000 pulses or more, ideally 40,000 pulses or more, per revolution.

Next, the injecting operation of the injection molding machine M will be described with reference to FIGS. 1 to 6.

The following descriptions starts from the state in which the injection molding machine M has completed a measuring step. Accordingly, the screw 2s is retreated to an injection start position. Upon start of an injection step, the controller 44 causes the servomotor 3 to run, thereby rotating the rotor shaft 7. Rotation of the rotor shaft 7 is transmitted to the ball screw 5 of the ball screw mechanism 4. Rotation of the ball screw 5 causes the nut 6 to advance. As a result, the rear slider 25, to which the nut 6 is attached, the load cell 37, the bearing retainer ring 36, the front slider 24, and the screw coupling 27 advance unitarily. Thus, the screw 2s also advances, thereby injecting a measured amount of resin present ahead of the screw 2s into an unillustrated mold.

In the injection step, rotation of low speed and high torque is directly transmitted from the servomotor 3 to the ball screw 5 of the ball screw mechanism 4, thereby drastically enhancing responsiveness of control and accuracy of control and avoiding imposition of unbalanced load on the rotor shaft 7 of the servomotor 3 which would otherwise result from use of a timing belt.

Since the position of the screw 2s and injection speed in the course of advancement of the screw 2s are detected by means of the rotary encoder 13 of high resolution, the position of the screw 2s and injection speed can be controlled at high accuracy. Further, in the injection step, the nut 6 moves in the direction of arrow H shown in FIG. 6. Accordingly, a front end portion of the rear slider 25 is pressed against the inner ring portion 37i of the load cell 37. On the basis of pressure detected by means of the load cell 37, injection pressure and dwell pressure are controlled. Since the rear slider 25 merely abuts the load cell 37 while being mounted on the guide shafts 23, stress (load) directed in a rotational direction and imposed on the nut 6 from the ball screw 5 is born by the rear slider 25 and is not imposed on the load cell 37. Thus, pressure can be detected at high accuracy.

Figure 7:
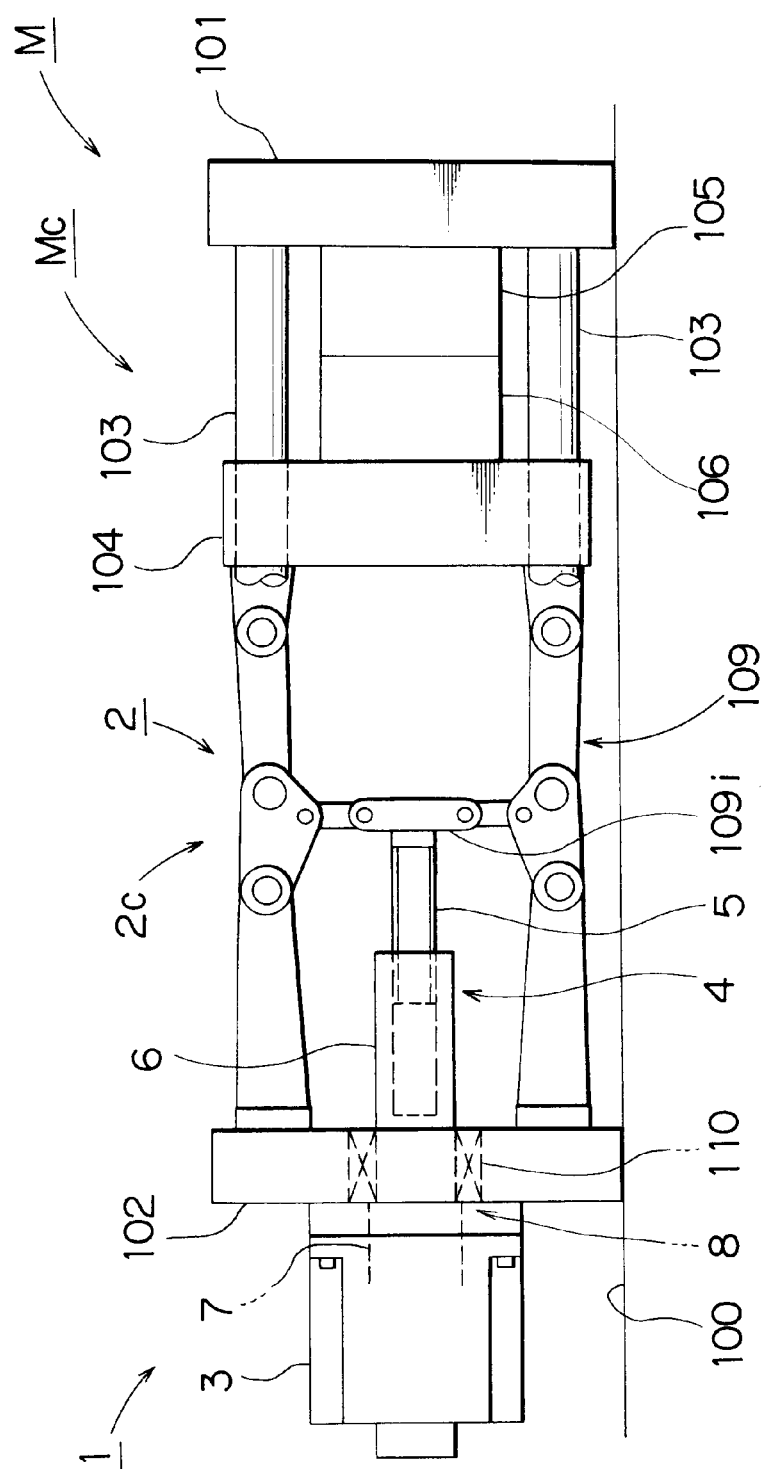
FIG. 7 is a side view of a mold clamping unit of an injection molding machine according to a modified embodiment of the present invention.

FIG. 7 shows a modified embodiment. In the embodiment sown in FIG. 1, the present invention is applied to the injection unit Mi. However, in the modified embodiment, the present invention is applied to a mold clamping unit Mc. In FIG. 7, reference numeral 100 denotes a machine base, on which are disposed a stationary platen 110 and a mold-clamping drive base 102 which are separated from each other. Four tie bars 103 extend between the stationary platen 101 and the mold-clamping drive base 102. A movable platen 104 is mounted slidably on the tie bars 103. A stationary mold 105 is attached to the stationary platen 101, and a movable mold 106 is attached to the movable platen 104. A toggle mechanism 109 constituting a mold clamping mechanism 2c is disposed between the mold-clamping drive base 102 and the movable platen 104. Further, a servomotor 3 is attached to an outer end surface of the mold-clamping drive base 102, and a nut 6 of a ball screw mechanism 4 is supported rotatably by the mold-clamping drive base 102 via a bearing 110. The distal end of a ball screw 5 of the ball screw mechanism 4 is coupled to an input member (cross head) 109i of the toggle mechanism 109, and the rotor shaft 7 of the servomotor 3 is connected directly to the end portion of the nut 6 by means of a coupling structure similar to the direct coupling structure 8 shown in FIG. 3.

Therefore, when the servomotor 3 is driven, the nut 6 rotates, and thus, the ball screw 5 advances and retracts, whereby a mold composed of the movable mold 106 and the stationary mold 105 can be opened and closed. The servomotor 3 shown in FIG. 7 has the same structure as that of the servomotor 3 shown in FIG. 3 and operates in the same manner.

While the present invention has been described with reference to the above embodiment, the present invention is not limited thereto. Regarding structural details, shape, material, quantity, among others, modifications and any omission or addition may be possible as needed without departing from the scope of the invention. For example, the screw 2s and the input member of the mold clamping mechanism 2c are shown as examples of the movable member 2. However, the movable member 2 may be an ejector pin or an injection unit itself. In the direct coupling structure 8, the recess 11 is formed in the rotor shaft 7 such that the recess 11 extends from the end face 7f. However, the direct coupling structure 8 may be modified such that a recess is formed in the ball screw 5 or the nut 6 such that the recess 11 extends from the end face thereof, and the end portion of the rotor shaft 7 is inserted into the recess. Although the exemplified structure of the direct coupling structure 8 is preferred, the present invention does not exclude use of a direct coupling structure of a different configuration, such as a spline coupling. Further, the ball screw mechanism includes a so-called roller screw mechanism.

What is claimed is:

1. An injection molding machine equipped with a drive mechanism which reciprocates a movable member by use of a servomotor and a ball screw mechanism, wherein:

an end portion of a rotor shaft of the servomotor is connected directly to an end portion of a ball screw or a nut of the ball screw mechanism for reciprocating the movable member, and a direct coupling structure such that an end portion of the ball screw or nut is inserted into a recess formed in the rotor shaft and extending axially from an end face of the rotor shaft, while a shaft restraining mechanism prevents rotation of the ball screw or nut with respect to the rotor shaft.

2. An injection molding machine according to claim 1, wherein the movable member is a screw of an injection unit.

3. An injection molding machine according to claim 1, wherein the movable member is an input member of a clamping mechanism of a mold clamping unit.

4. An injection molding machine according to claim 1, wherein the servomotor has a stator which comprises:

a yoke member formed through lamination of a number of annular silicon steel plates into the form of a cylinder;

at least 36 core portions formed on the inner side of the yoke member at circumferentially constant pitches; and a stator coil wound around each of the core portions.

5. An injection molding machine according to claim 1, wherein the servomotor is equipped with a Leigh resolution rotary encoder.

6. An injection molding machine according to claim 1, further comprising a rotary encoder for outputting 20,000 pulses or more per revolution of the rotor of the servomotor.

* * * * *